(12) United States Patent
Yu et al.

(10) Patent No.: US 10,084,948 B2
(45) Date of Patent: Sep. 25, 2018

(54) PORTABLE ELECTRONIC DEVICE HAVING MECHANISM TO MOVE EMBEDDED CAMERA MODULE TO DIFFERENT POSITIONS

(71) Applicant: Altek Semiconductor Corp., Hsinchu (TW)

(72) Inventors: Yung-Neng Yu, Hsinchu (TW); Jui-Hsin Chang, Hsinchu (TW)

(73) Assignee: Altek Semiconductor Corp., Hsinchu (TW)

(*) Notice: Subject to any disclaimer, the term of this patent is extended or adjusted under 35 U.S.C. 154(b) by 1 day.

(21) Appl. No.: 15/245,216

(22) Filed: Aug. 24, 2016

(65) Prior Publication Data

US 2017/0280033 A1 Sep. 28, 2017

Related U.S. Application Data

(60) Provisional application No. 62/312,469, filed on Mar. 24, 2016.

(30) Foreign Application Priority Data

Jul. 19, 2016 (TW) .............................. 105122698 A (51) Int. Cl.
*H04N 5/225* (2006.01)
*G02B 13/00* (2006.01)
(Continued)

(52) U.S. Cl.
CPC ....... *H04N 5/2257* (2013.01); *G02B 13/0055* (2013.01); *G02B 13/06* (2013.01); *G03B 17/04* (2013.01)

(58) Field of Classification Search
CPC .. H04N 5/2257; G02B 13/0055; G02B 13/06; G03B 17/04
See application file for complete search history.

(56) References Cited

U.S. PATENT DOCUMENTS 7,596,832 B2 * 10/2009 Hsieh ...................... E05D 11/06
16/342
8,203,646 B2 * 6/2012 Fan ...................... H04N 5/2252
348/207.1
(Continued)

FOREIGN PATENT DOCUMENTS

| CN | 1299101 | 6/2001 |
|---|---|---|
| TW | I360383 | 3/2012 |
| TW | 201500887 | 1/2015 |

OTHER PUBLICATIONS

"Office Action of Taiwan Counterpart Application," dated Mar. 23, 2017, p. 1-p. 5.

*Primary Examiner* — Shahbaz Nazrul
(74) *Attorney, Agent, or Firm* — JCIPRNET (57) ABSTRACT

A portable electronic device including a main body, a camera module and a movement mechanism is provided. The main body has an accommodating groove located in the main body and exposed at a surface thereof. The camera module is disposed in the accommodating groove, and the camera module has a wide angle lens. The movement mechanism is located between the camera module and the accommodating groove, and the camera module is configured to move between a first position and a second position in the accommodating groove. When the camera module is located at the first position, an upper surface of the wide angle lens is lower than or equal to the surface of the main body. When the camera module is located at the second position, the wide angel lens is protruded out of the surface of the main body.

10 Claims, 12 Drawing Sheets

(51) Int. Cl.
*G03B 17/04* (2006.01)
*G02B 13/06* (2006.01)

(56) References Cited

U.S. PATENT DOCUMENTS

| | | | | |
|---|---|---|---|---|
| 8,432,485 | B1* | 4/2013 | Martinez | H04N 5/2254 |
| | | | | 348/207.1 |
| 8,814,447 | B1* | 8/2014 | Hambergen | G03B 17/04 |
| | | | | 396/348 |
| 9,288,471 | B1* | 3/2016 | Yang | H04N 13/0221 |
| 9,392,148 | B2* | 7/2016 | Kim | G06F 1/1605 |
| 2005/0073155 | A1* | 4/2005 | Weng | G06F 1/1616 |
| | | | | 292/138 |
| 2007/0018949 | A1* | 1/2007 | Chang | G06F 1/1616 |
| | | | | 345/156 |
| 2008/0123314 | A1* | 5/2008 | Cheng | G06F 1/1616 |
| | | | | 361/809 |
| 2008/0198262 | A1* | 8/2008 | Kuo | G06F 1/1616 |
| | | | | 348/373 |
| 2008/0252772 | A1* | 10/2008 | Nozaki | H04N 5/2251 |
| | | | | 348/340 |
| 2009/0082066 | A1* | 3/2009 | Katz | G06F 1/3203 |
| | | | | 455/566 |
| 2011/0013076 | A1* | 1/2011 | Ko | G06F 1/1686 |
| | | | | 348/373 |

* cited by examiner

PORTABLE ELECTRONIC DEVICE HAVING MECHANISM TO MOVE EMBEDDED CAMERA MODULE TO DIFFERENT POSITIONS

CROSS-REFERENCE TO RELATED APPLICATION

This application claims the priority benefits of U.S. provisional application Ser. No. 62/312,469, filed on Mar. 24, 2016 and Taiwan application serial no. 105122698, filed on Jul. 19, 2016. The entirety of each of the above-mentioned patent applications is hereby incorporated by reference herein and made a part of this specification.

BACKGROUND OF THE INVENTION

Field of the Invention

The invention relates to a portable electronic device, and particularly relates to a portable electronic device having a camera module.

Description of Related Art

Along with development of technology, users of general portable electronic devices such as mobile phones or tablet PCs may have higher demand on a camera function and quality of the electronic devices. Besides, in recent years, user's demand of directly using the portable electronic device to implement fish-eye or wide angle photographing is obviously increased. However, since a fish-eye lens or a wide angle lens is curved and protrudes outward, if the fish-eye lens or the wide angle lens is directly installed on the electronic device such as the mobile phone or the table PC, the lens is protruded out of a surface of the device. Therefore, during a process that the user uses the portable electronic device, the lens of the camera module is liable to rub or collide with a desk surface or other objects to cause damage.

Although a current user may use various auxiliary fixtures to hold the fish-eye lens or the wide angle lens on a camera lens of a general portable electronic device, the above lens configuration method may increase an overall weight of the portable electronic device, and decrease a carry or usage convenience of the portable electronic device. Moreover, the additionally configured fish-eye lens or the wide angle lens has to be set corresponding to the lens of the camera module of the portable electronic device. Therefore, the fish-eye lens or the wide angle lens is relatively limited in photographing angles and directions.

SUMMARY OF THE INVENTION

The invention is directed to a portable electronic device, in which a camera module is configured to move relative to a main body of the electronic device, such that a wide angle lens of the camera module is configured to be embedded in the main body of the electronic device to provide proper shield and protection to the wide angle lens. Alternatively, the wide angle lens of the camera module is also configured to protrude out of a surface of the portable electronic device to implement wide angle mode photographing.

The invention provides a portable electronic device including a main body, a camera module and a movement mechanism. The main body has an accommodating groove located in the main body and exposed at a surface thereof. The camera module is disposed in the accommodating groove, and the camera module has a wide angle lens. The movement mechanism is located between the camera module and the accommodating groove, and the camera module is configured to move between a first position and a second position in the accommodating groove through the movement mechanism. When the camera module is located at the first position, an upper surface of the wide angle lens is lower than or equal to the surface of the main body. When the camera module is located at the second position, the wide angle lens is protruded out of the surface of the main body.

In an embodiment of the invention, the wide angle lens is an ultra-wide angle lens or a fish-eye lens.

In an embodiment of the invention, the movement mechanism includes a slide rail, which is disposed on a wall of the accommodating groove in extension along a thickness direction of the main body. The camera module has a protrusion portion, which is disposed on a side surface of the camera module corresponding to the slide rail, and slidingly disposed in the slide rail, such that the camera module is configured to slide between the first position and the second position along the slide rail.

In an embodiment of the invention, the movement mechanism is a pivot. The pivot is disposed on a side surface of the camera module, and the pivot is movably disposed in a pivot hole on a wall of the accommodating groove, such that the camera module is configured to rotate from the first position to the second position along the pivot.

In an embodiment of the invention, the movement mechanism includes a pivot and a first slide chute. The first slide chute is disposed on a wall of the accommodating groove in extension along a direction perpendicular to a thickness direction of the main body, and the pivot is pivotally connected to the camera module and the first slide chute, such that the camera module is configured to pivotally rotate along the pivot and slide along the first slide chute to move from the first position to the second position.

In an embodiment of the invention, the main body has a front surface and a back surface opposite to each other, and the portable electronic device has a display screen disposed on the front surface.

In an embodiment of the invention, when the camera module is moved to the second position, the wide angle lens is protruded out of a side surface connecting the front surface and the back surface.

In an embodiment of the invention, the movement mechanism further includes a second slide chute. The second slide chute is disposed on the wall of the accommodating groove in extension along the thickness direction of the main body, and the first slide chute and the second slide chute are perpendicularly intersected with each other.

In an embodiment of the invention, when the camera module is slid to the second position along the second slide chute, the wide angle lens is protruded out of the back surface.

In an embodiment of the invention, when the camera module is slid to the second position along the second slide chute, the wide angle lens is protruded out of the front surface.

In an embodiment of the invention, a thickness of the camera module is smaller than or equal to a thickness of the main body.

In an embodiment of the invention, the portable electronic device is a smart phone or a tablet personal computer.

In an embodiment of the invention, when the camera module is moved to the second position, the camera module is configured to photograph a wide angle image through the wide angle lens.

According to the above descriptions, the camera module of the portable electronic device of a plurality of embodiments of the invention has the wide angle lens. Moreover, the main body of the portable electronic device has the accommodating groove located at a surface thereof. The camera module is disposed in the accommodating groove, and is configured to move between the first position and the second position in the accommodating groove through the movement mechanism. When the camera module is located at the first position, the upper surface of the wide angle lens is lower than or equal to the surface of the main body, so as to provide proper shield and protection to the wide angle lens to avoid the wide angle lens being rubbed or collided to cause damage. When the camera module is located at the second position, the wide angle lens is protruded out of the surface of the main body, so as to mitigate a situation that the main body of the portable electronic device shields an incident light and a photographing angle of the wide angle lens, and a user may directly implement wide angle photographing through the wide angle lens of the portable electronic device.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In following embodiments, the same reference numbers are used in the drawings and the description to refer to the same or like parts, where shapes, sizes, proportions, etc., of the components shown in figures are only schematic, which are not used for limiting an implementation range of the invention. Moreover, although multiple technical features are simultaneously disclosed in any of following embodiments, it doesn't mean that all of the technical features in the embodiment must be implemented at the same time.

Figure 1A:
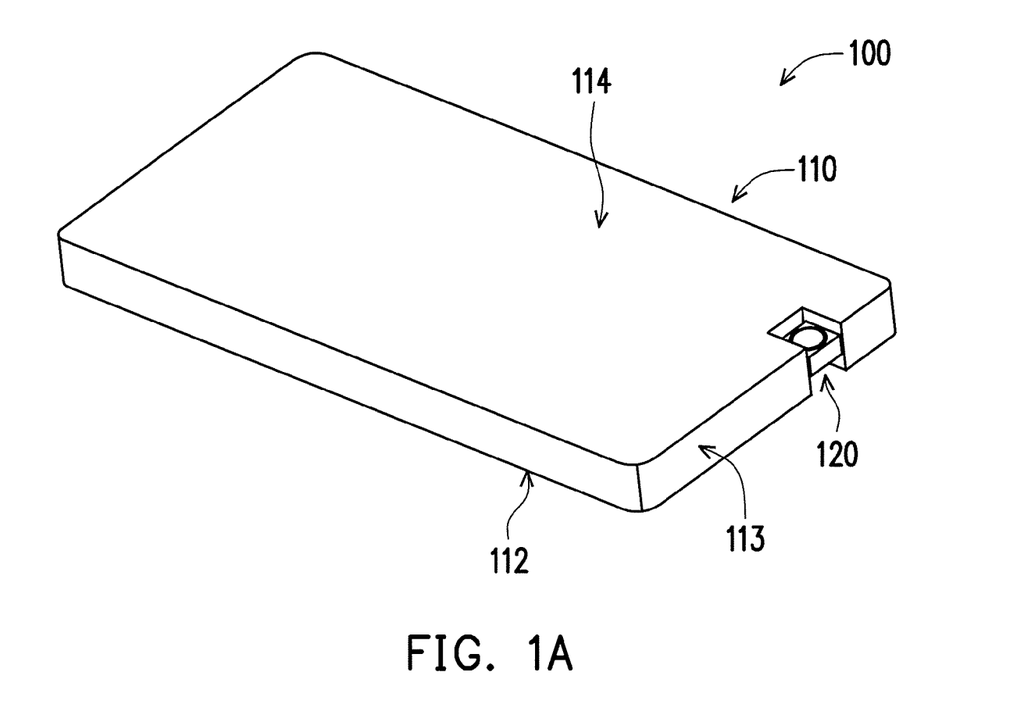
FIG. 1A to FIG. 1F are three-dimensional views of a portable electronic device according to an embodiment of the invention.
Figure 1B:
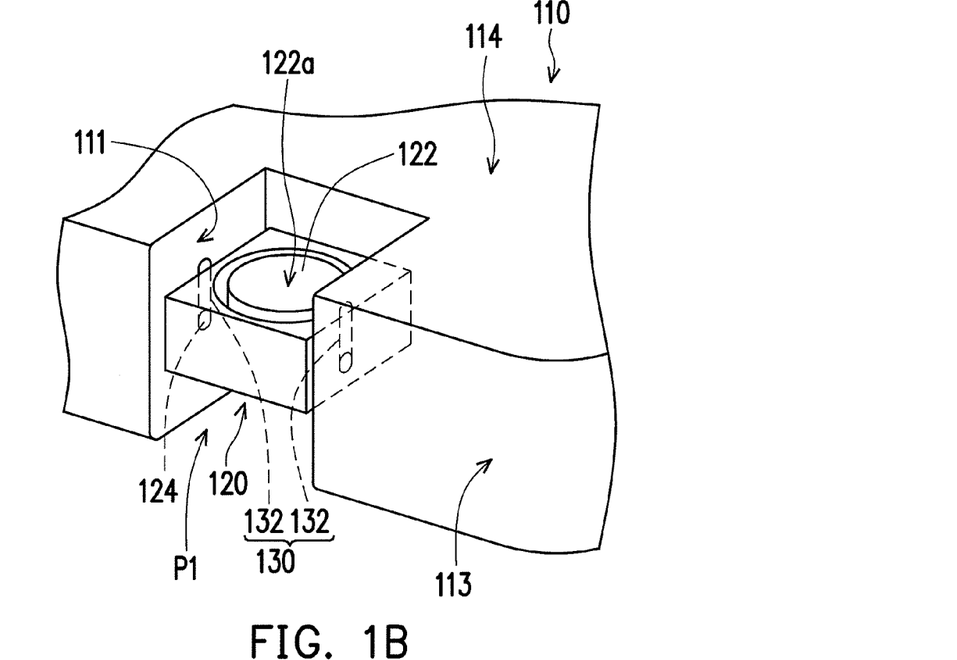
Figure 1C:
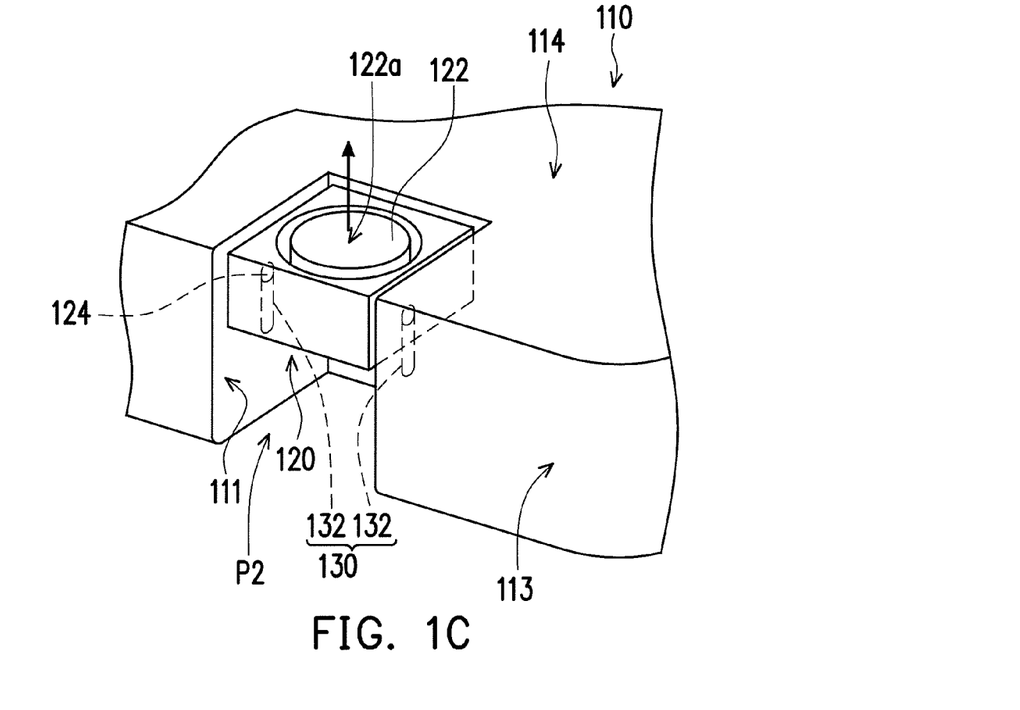
Figure 1D:
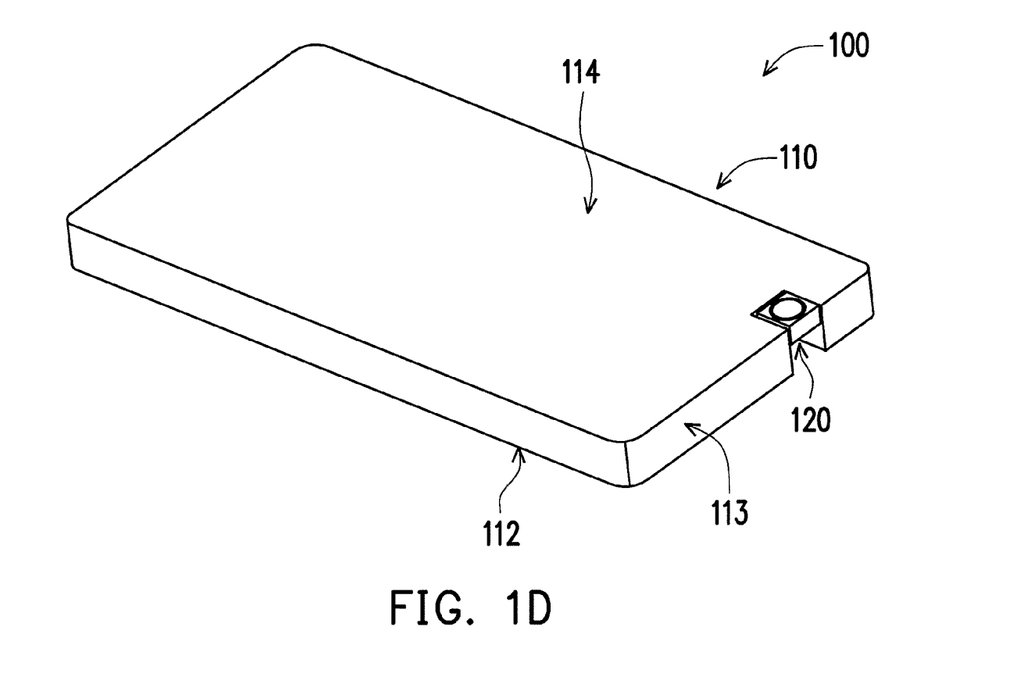

FIG. 1A to FIG. 1F are three-dimensional views of a portable electronic device according to an embodiment of the invention. Referring to FIG. 1A to FIG. 1D, in the present embodiment the portable electronic device 100 includes a main body 110, a camera module 120 and a movement mechanism 130. The portable electronic device 100 of the present embodiment is, for example, a smart phone or a tablet personal computer. Moreover, the main body 110 has an accommodating groove 111 located in the main body 110 and exposed at a surface of thereof. The camera module 120 is disposed in the accommodating groove 111, and the camera module 120 has a wide angle lens 122. In the present embodiment, the wide angle lens 122 is, for example, an ultra-wide angle lens or a fish-eye lens. Moreover, the movement mechanism 130 is located between the camera module 122 and the accommodating groove 111. Referring to FIG. 1B and FIG. 1C, the camera module 120 is configured to move between a first position P1 and a second position P2 in the accommodating groove 111 through the movement mechanism 130.

As shown in FIG. 1A and FIG. 1B, when the camera module 120 is located at the first position P1, i.e. an original position of the camera module 120, a height of an upper surface 122a of the wide angle lens 122 of the camera module 120 along a lens direction is lower than or equal to the surface of the main body 110. Moreover, as shown in FIG. 1B and FIG. 1C, the upper surface 122a of the wide angle lens 122 is an arc surface, and when the camera module 120 is moved to the second position P2, the upper surface 122a of the wide angle lens 122 is higher than the surface of the main body 110, such that the wide angle lens 122 of the camera module 120 is protruded out of and exposed on the surface of the main body 110.

For example, the main body 110 of the portable electronic device 100 may have a front surface 112, a back surface 114 and a side surface 113 connecting the front surface 112 and the back surface 114. In the present embodiment, the front surface 112 of the main body 110 can be configured with a display or touch element such as a display panel or a touch display panel. Moreover, the accommodating groove 111 is, for example, through accommodating groove, which penetrates through the front surface 112 and the back surface 114 of the main body 110 along a direction parallel to a thickness direction of the main body 110. Moreover, the accommodating groove has an opening on the side surface 113 of the main body 110 to expose the camera module 120.

As shown in FIG. 1A, the lens direction of the wide angle lens 122 of the camera module 120 is, for example, a direction facing the back surface 114 of the main body 110 in order to capture images in front of the user. However, in another embodiment of the invention that is not illustrated, the lens direction of the wide angle lens 122 may also face the front surface 112 of the main body 110 to facilitate the user taking pictures of himself or taking pictures behind the back of the user by using the wide angle lens 122.

To be specific, in the present embodiment, a thickness of the camera module 120 is smaller than or equal to a thickness of the main body 110. Therefore, when the camera module 120 is located at the first position P1 in the accommodating groove 111, the wide angle lens 122 of the camera module 120 can be embedded in the accommodating groove 111. Therefore, when the portable electronic device 100 is placed on a desktop by the user or is in a usage process, the wide angle lens 122 of the camera module 120 can be properly shielded and protected by the accommodating groove 111 of the main body 110, so as to avoid collision or friction between the wide angle lens 122 and the desktop or surrounding objects.

Referring to FIG. 1B and FIG. 1C, when the user wants to use the wide angle lens 122 to implement wide angle mode photographing, an angle that a light incident to or emitted from the wide angle lens 122 is larger, for example, larger than or equal to 180 degrees. However, when the wide angle lens 122 of the camera module 120 is embedded in the accommodating groove 111, an inner wall of the accommodating groove 111 may shield a part of a photographing angle and a light incident or emitting angle of the wide angle lens 122. Therefore, in the present embodiment, the camera module 120 is moved to the second position P2 close to the back surface 114 of the main body 110 in FIG. 1C through the movement mechanism 130, such that the upper surface 122a of the wide angle lens 122 is higher than the back surface 114 of the main body 110. Therefore, the wide angle lens 122 can be protruded out of the accommodating groove 111 and exposed on the back surface 114 of the main body 110, such that the photographing angle of the wide angle lens 122 and the incident and emitting lights thereof are not shielded or interfered by the main body 110, so as to achieve a full-size panoramic photographing effect greater than or equal to 180 degrees.

In the present embodiment, the movement mechanism 130 may include a slide rail 132, as shown in FIG. 1C, the slide rail 132 can be configured in extension along the thickness direction of the main body 110. In the present embodiment, the slide rail 132 is, for example, disposed on walls of the accommodating groove 111 located adjacent to two opposite side surfaces of the camera module 120. Moreover, in other embodiment that is not illustrated, the slide rail 132 can also be disposed on all walls of the accommodating groove 111 located adjacent the side surfaces of the camera module 120, or only disposed on one of the walls of the accommodating groove 111 located adjacent to the side surfaces of the camera module 120. Configuration position, configuration method and the number of the slide rail 132 are not limited by the invention.

The camera module 120 has protrusion portions 124 disposed on side surfaces of the camera module 120 corresponding to the slide rail 132. As shown in FIG. 1B, the protrusion portions 124 disposed at two opposite sides of the camera module 120 can be respectively slidingly disposed in the slide rail 132. Therefore, the camera module 120 can be slid up and down along the thickness direction of the main body 110 through the protrusion portions 124 and the slide rail 132. Particularly, when the user wants to use the camera module 120 of the portable electronic device 100 to implement the wide angle mode photographing, the camera module 120 can be slid from the first position P1 in the accommodating groove 111 to the second position P2 close to the surface of the main body 110 along an arrow (a thick arrow) direction shown in FIG. 1C, so as to mitigate shield and interference of the walls of the accommodating groove 111 on the lights and the photographing angles. Moreover, when the user completes the wide angle mode photographing, or wants to continually perform normal mode photographing, the camera module 120 can be slid from the second position P2 back to the accommodating groove 111, so as to avoid collision or friction of the wide angle lens 122 during a usage process of the portable electronic device 100 to cause damage.

In the present embodiment, the user may slide the camera module 120 between the aforementioned first position P1 and the second position P2 according to actual requirements on photographing angles and lights, so as to adjust the position of the wide angle lens 122. Moreover, the user may manually adjust the position of the camera module 120. Alternatively, the user may also control the camera module 120 to be automatically slid with an application program built in the portable electronic device 100 and a magnetic element configured inside. Moreover, in the present embodiment, a positioning member (not shown) can be additionally configured on the slide rail 132, such that when the camera module 120 is slid to the second position P2, the camera module 120 can be temporarily fixed to the second position P2 to facilitate photographing.

Figure 1E:
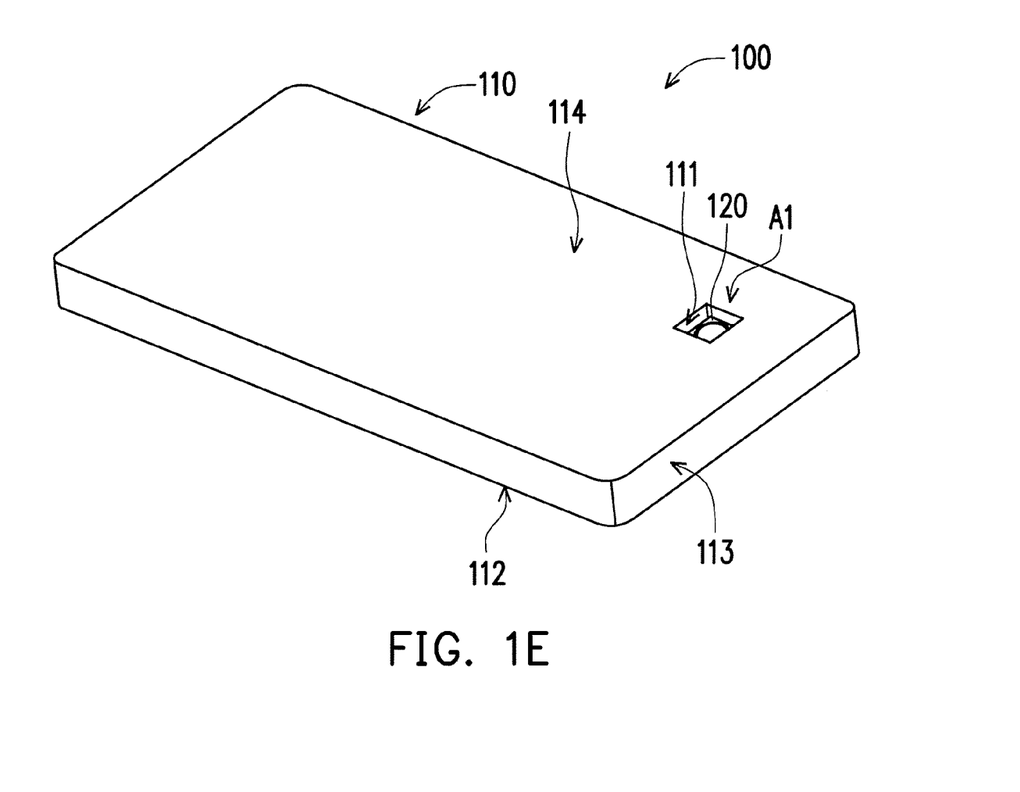
Figure 1F:
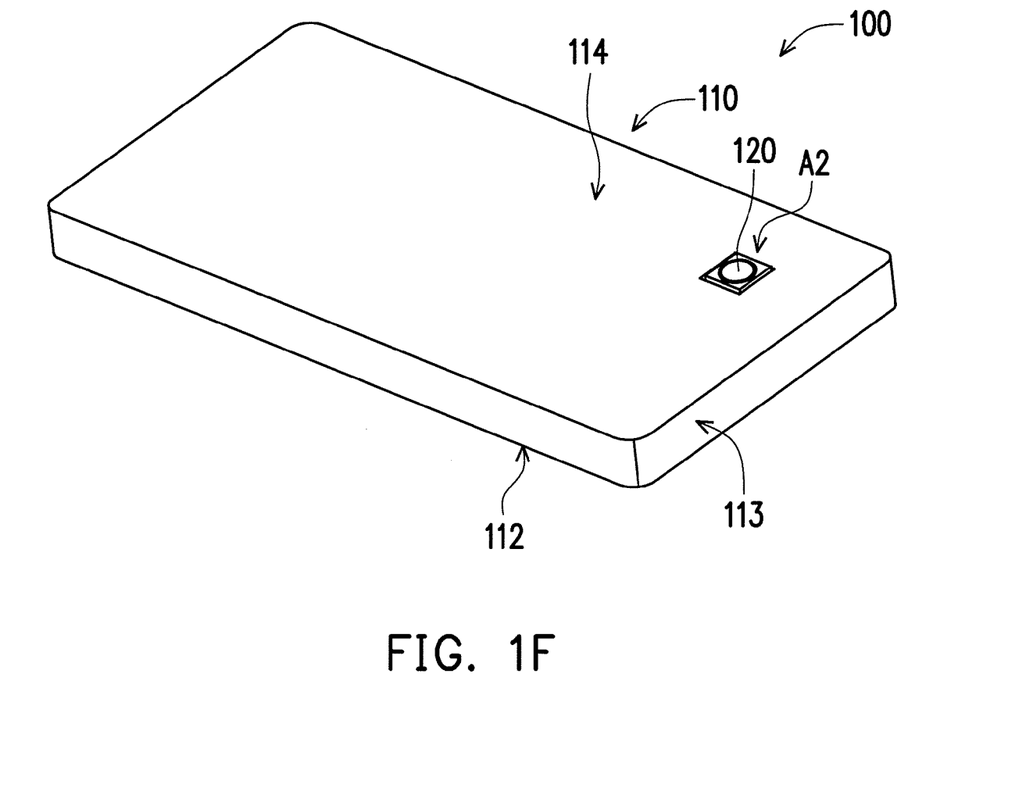

Referring to FIG. 1E and FIG. 1F, in the present embodiment, besides that the accommodating groove 111 of the camera module 120 can be configured on the side surface 113 of the main body 110 and penetrate through the front surface 112 and the back surface 114 of the main body 110 as described above, the accommodating groove 111 of the camera module 120 can also be directly disposed in, for example, the back surface 114 of the main body 110. When the camera module 120 of the portable electronic device 100 does not perform the wide angle photographing, the camera module 120 can be retracted to a position A1 shown in FIG. 1E, i.e. embedded in the accommodating groove 111, such that the upper surface 122a of the wide angle lens 122 is lower than or equal to the back surface 114 of the main body 110.

When the camera module 120 of the portable electronic device 100 performs the wide angle photographing, the camera module 120 can be moved to the position A2 shown in FIG. 1F through the aforementioned slide rail 132, such that the upper surface 122a of the wide angle lens 122 of the camera lens 120 is higher than the back surface 114 of the main body 110. Therefore, the wide angle lens 122 can be protruded out of the back surface 114 to perform the wide angle photographing.

Moreover, in another implementation that is not illustrated, the accommodating groove 111 can also be configured in the front surface 112 of the main body 110 according to the same configuration method shown in FIG. 1E and FIG. 1E, and detailed configuration method thereof is not repeated.

Figure 2A:
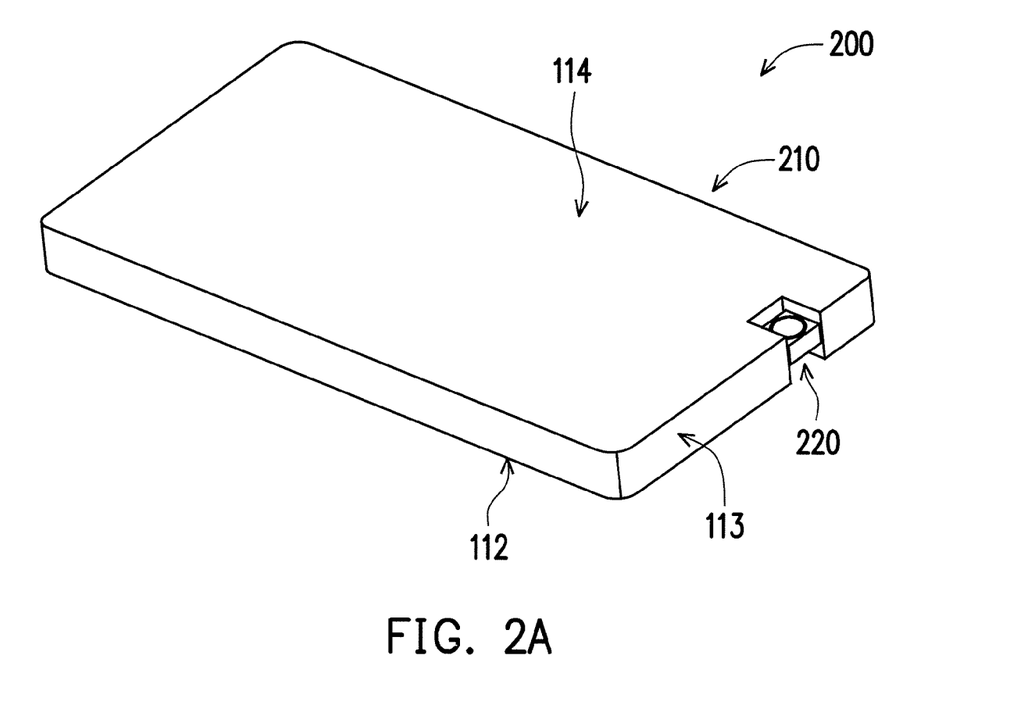
FIG. 2A to FIG. 2D are three dimensional views of a portable electronic device according to another embodiment of the invention.
Figure 2B:
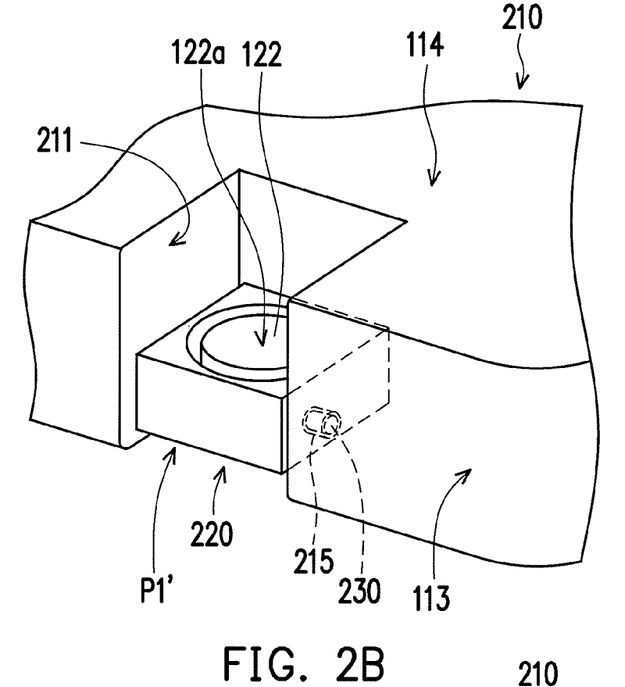

FIG. 2A to FIG. 2D are three dimensional views of a portable electronic device according to another embodiment of the invention. The portable electronic device 200 in FIG. 2A to FIG. 2D is similar to the portable electronic device 100 of the aforementioned embodiment in structure, so that the same or similar components are denoted by the same or similar referential numbers, and details thereof are not repeated. A difference between the portable electronic device 200 and the portable electronic device 100 is that the movement mechanism 130 of the portable electronic device 200 is a pivot, and the pivot 230 is disposed at a side surface of the camera module 120. Moreover, as shown in FIG. 2B, a wall of the accommodating groove 211 of the main body 210 has a pivot hole 215 configured corresponding to the pivot 230, and the pivot 230 is movably disposed in the pivot hole 215.

Figure 2C:
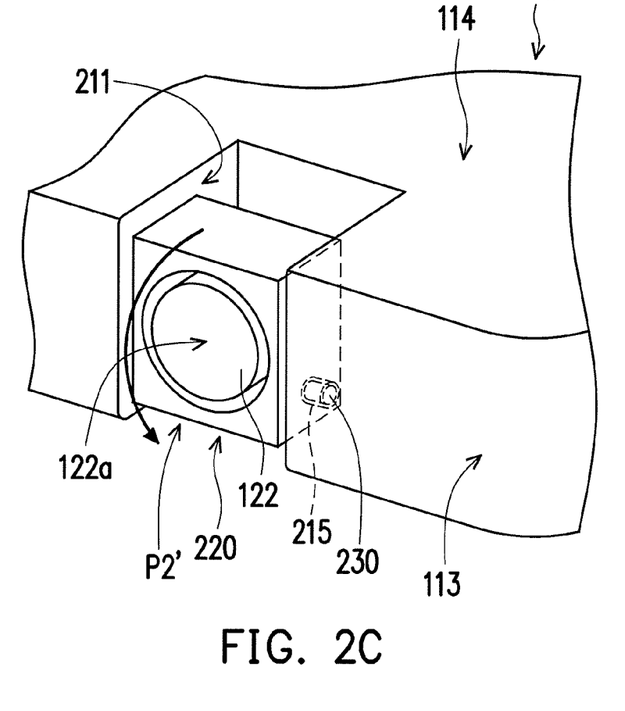
Figure 2D:
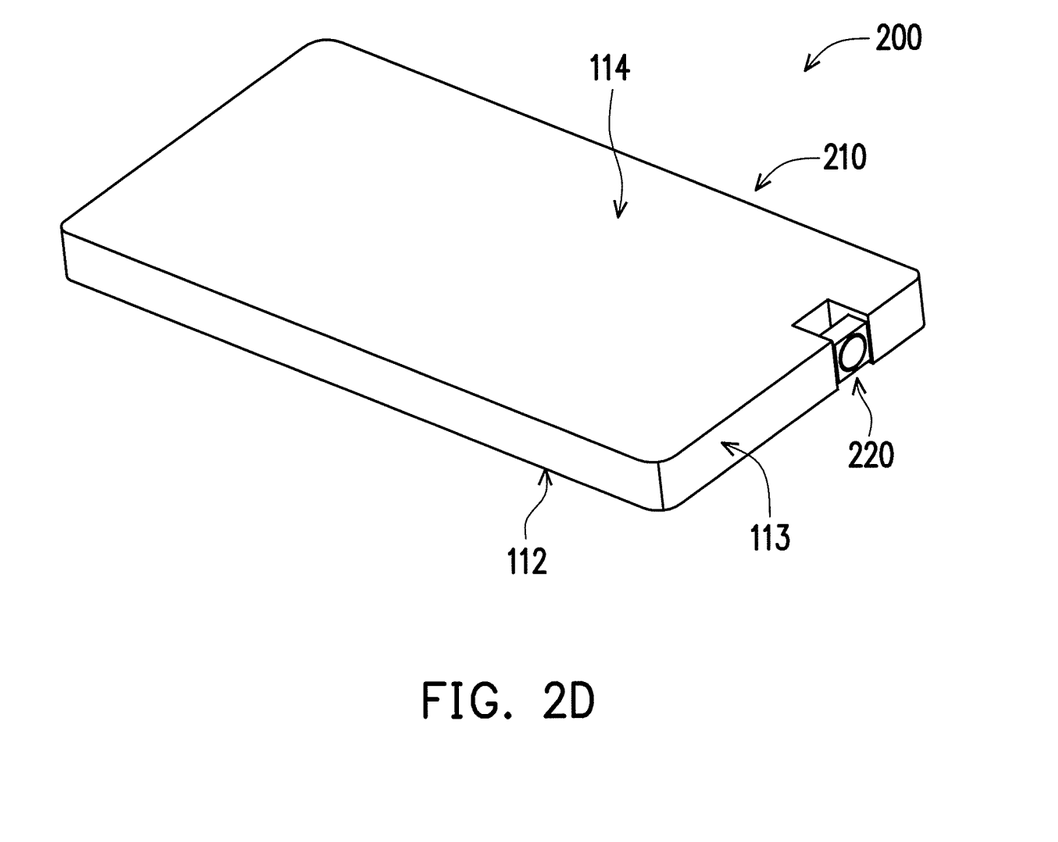

Referring to FIG. 2B and FIG. 2C, in the present embodiment, the camera module 220 can be pivotally rotated relative to the main body 210 by 90 degrees along the pivot 230, such that the camera module 220 is pivotally rotated from a first position P1' in the accommodating groove 211 to a second position P2' along an arrow (a thick arrow) direction shown in FIG. 2C. As shown in FIG. 2C and FIG. 2D, when the camera module 220 is pivotally rotated to the second position P2', the upper surface 122a of the wide angle lens 122 is higher than the surface of the main body 210, such that the wide angle lens 122 is protruded out of the surface of the main body 210 and the accommodating groove 211, so as to avoid a situation that the walls of the accommodating groove 211 of the main body 210 shield or interfere the photographing angle and incident lights of the wide angle lens 122 when the user uses the wide angle lens 122 to perform wide angle mode or fish-eye mode photographing.

When the user completes the wide angle mode photographing, or wants to continually perform normal mode photographing, the camera module 220 can be again rotated relative to the main body 210 by 90 degrees to return to the original first position P1' from the second position P2' shown in FIG. 2C along the pivot 230. Therefore, the wide angle lens 122 of the camera module 220 may return to the embedded position in the accommodating groove 211, such that the accommodating groove 211 of the main body 210 may provide proper protection and shield to the wide angle lens 122 to avoid friction or collision of the wide angle lens 122 to cause damage.

In the present embodiment, a positioning member (not shown) can be additionally configured between the pivot 230 and the pivot hole 215, such that when the camera module 220 is pivotally rotated by 90 degrees to move from the first position P1' shown in FIG. 2B to the second position P2' shown in FIG. 2C, the camera module 220 can be temporarily fixed to the second position P2' to facilitate photographing. Moreover, in the present embodiment, in the portable electronic device 200, the pivot 230 can be driven to pivotally rotate in a manual or electric manner, so as to drive the camera module 220 to rotate relative to the main body 210.

FIG. 3A to FIG. 3E are three-dimensional views of a portable electronic device according to another embodiment of the invention. The portable electronic device 300 in FIG. 3A to FIG. 3E is similar to the portable electronic device 100 of the aforementioned embodiment in structure, so that the same or similar components are denoted by the same or similar referential numbers, and details thereof are not repeated. A difference between the portable electronic device 300 and the portable electronic device 100 is that the movement mechanism 330 of the portable electronic device 300 includes a pivot 332 and a first slide chute 334. In the present embodiment, the first slide chute 334 is disposed on a wall of the accommodating groove 311 adjacent to the camera module 320 along a direction perpendicular to a thickness direction of the main body 310, and the pivot 332 is pivotally connected to the camera module 320 and the first slide chute 334. In the present embodiment, the camera module 320 can be rotated relative to the main body 310 by 90 degrees along the pivot 332, such that the wide angle lens 122 is rotated from a direction facing the back surface 114 of the main body 310 shown in FIG. 3A and FIG. 3B to a direction facing the side surface 113 of the main body 310 along an arrow (a thick arrow) direction shown in FIG. 3C. Moreover, after the camera module 320 is pivotally rotated by 90 degrees relative to the main body 310, the camera module 320 can be further slid towards the side surface 113 of the main body 310 (along a thick arrow direction shown in FIG. 3D) through the first slide chute 334, such that the upper surface 122a of the wide angle lens 122 is higher than the side surface 113 of the main body 110, and the wide angle lens 122 is protruded out of the side surface 113 of the main body 310 and the accommodating groove 311.

Figure 3A:
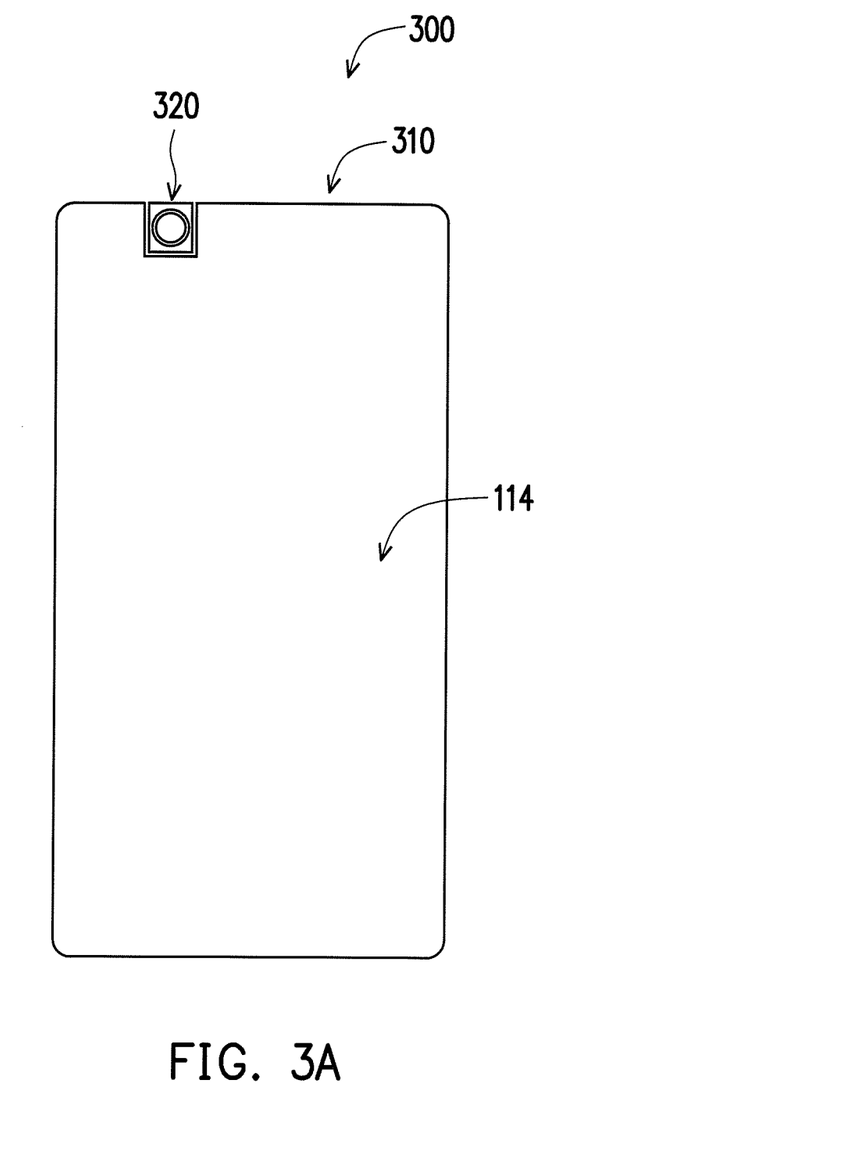
FIG. 3A to FIG. 3E are three-dimensional views of a portable electronic device according to another embodiment of the invention.
Figure 3B:
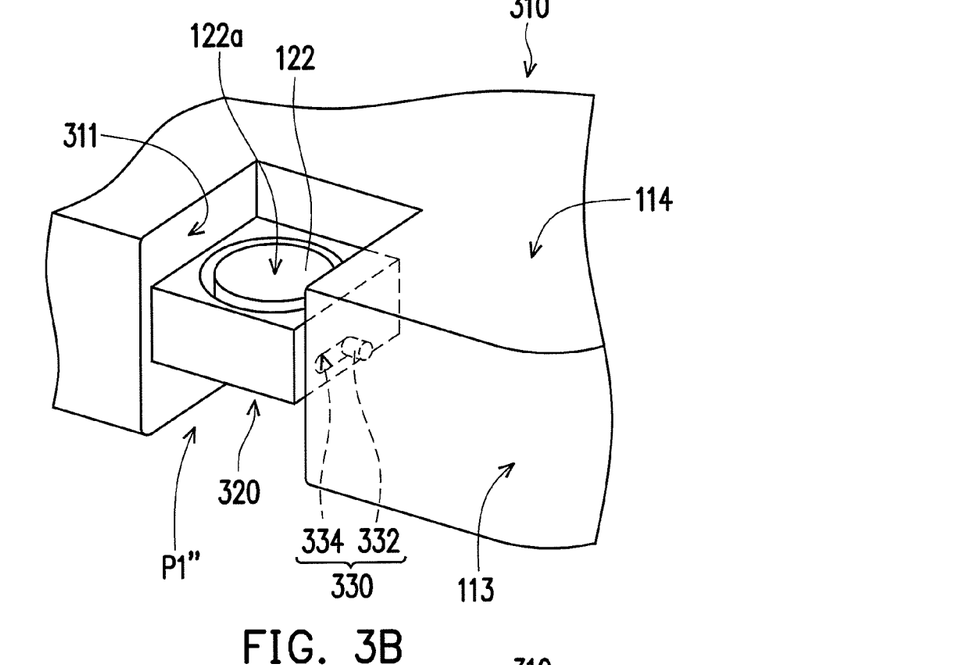
Figure 3C:
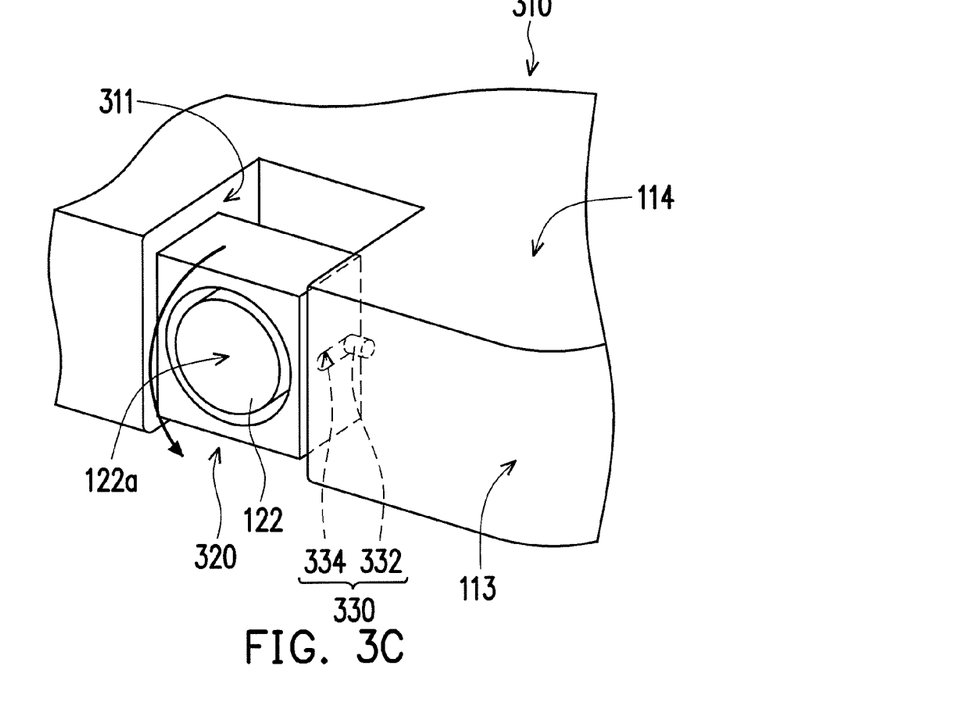
Figure 3D:
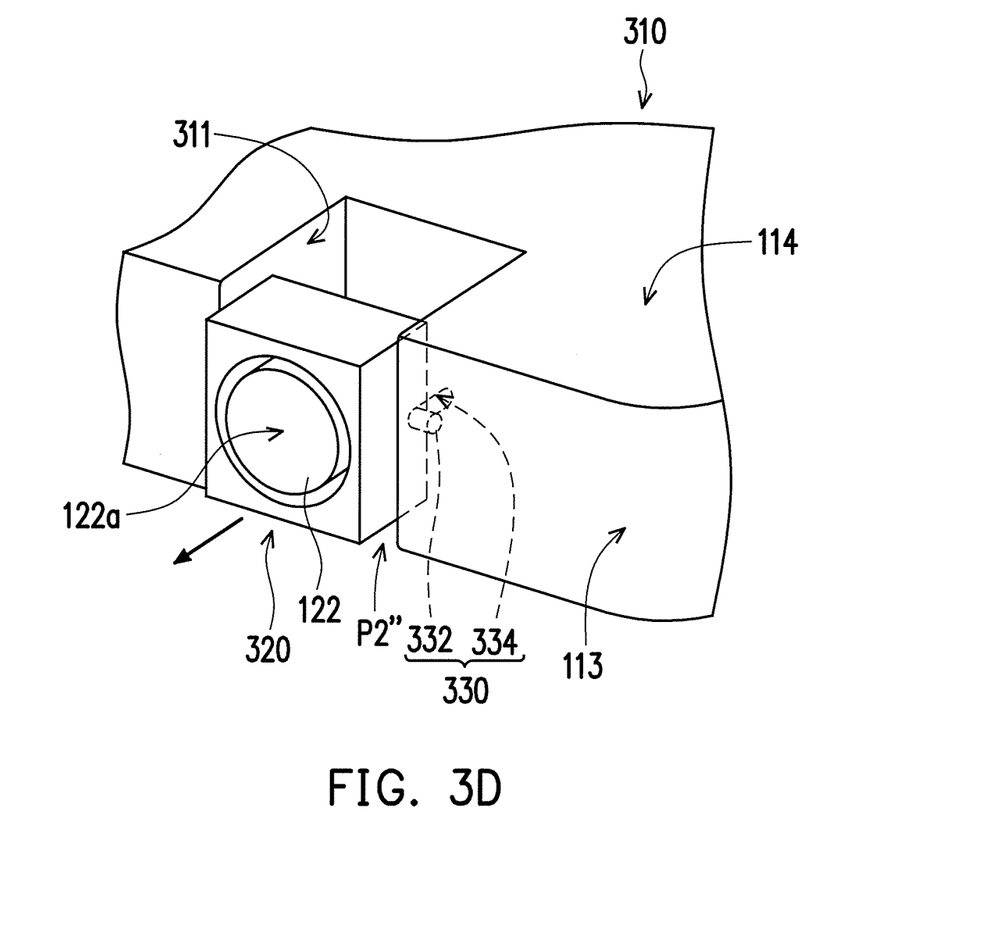
Figure 3E:
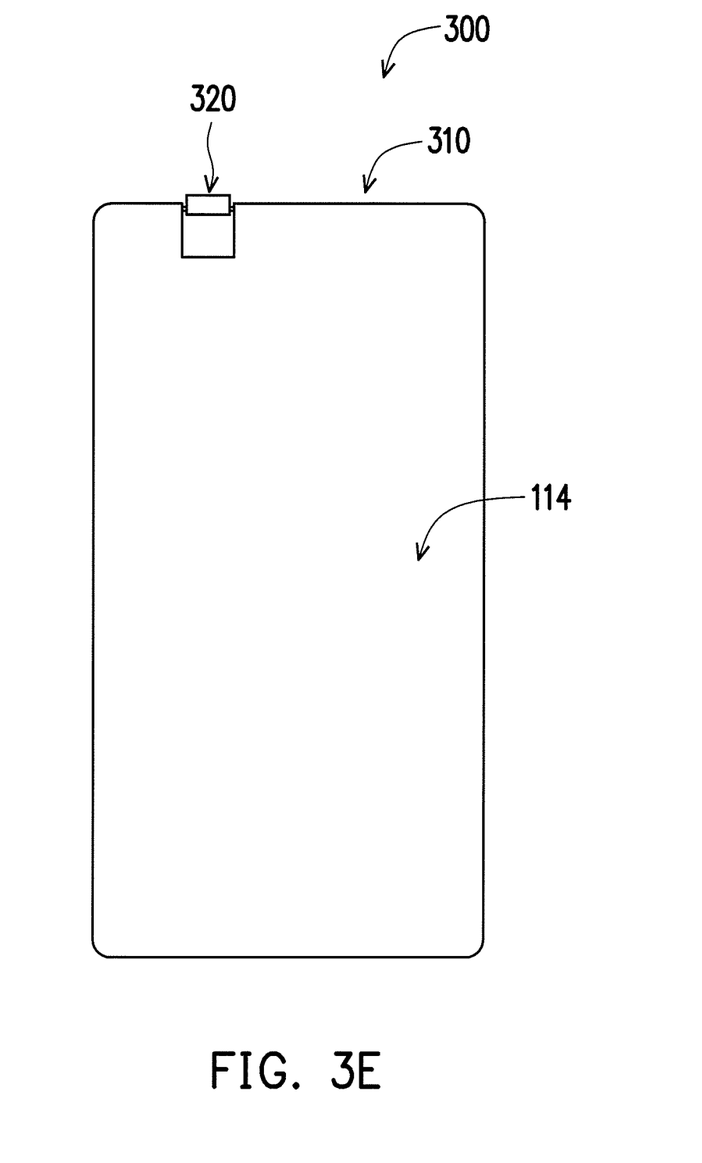

In the present embodiment, the camera module 320 is moved from a first position P1" shown in FIG. 3B to a second position P2" shown in FIG. 3D and FIG. 3E through the aforementioned operation. Moreover, besides that the wide angle lens 122 of the camera module 320 is rotated by 90 degrees through the aforementioned movement, the camera module 320 is further slid along the first slide chute 334, and the wide angle lens 122 thereof is protruded out of the side surface 113 of the main body 310. Therefore, the wide angle lens 122 of the camera module 320 may acquire better photographing angle and light incident angle, so as to mitigate shield and interference of the main body 310 of the portable electronic device 300 on the wide angle lens 122, and acquire photographing images of the wide angle mode or the fish-eye mode with good quality under the wide angle photographing mode.

Figure 4:
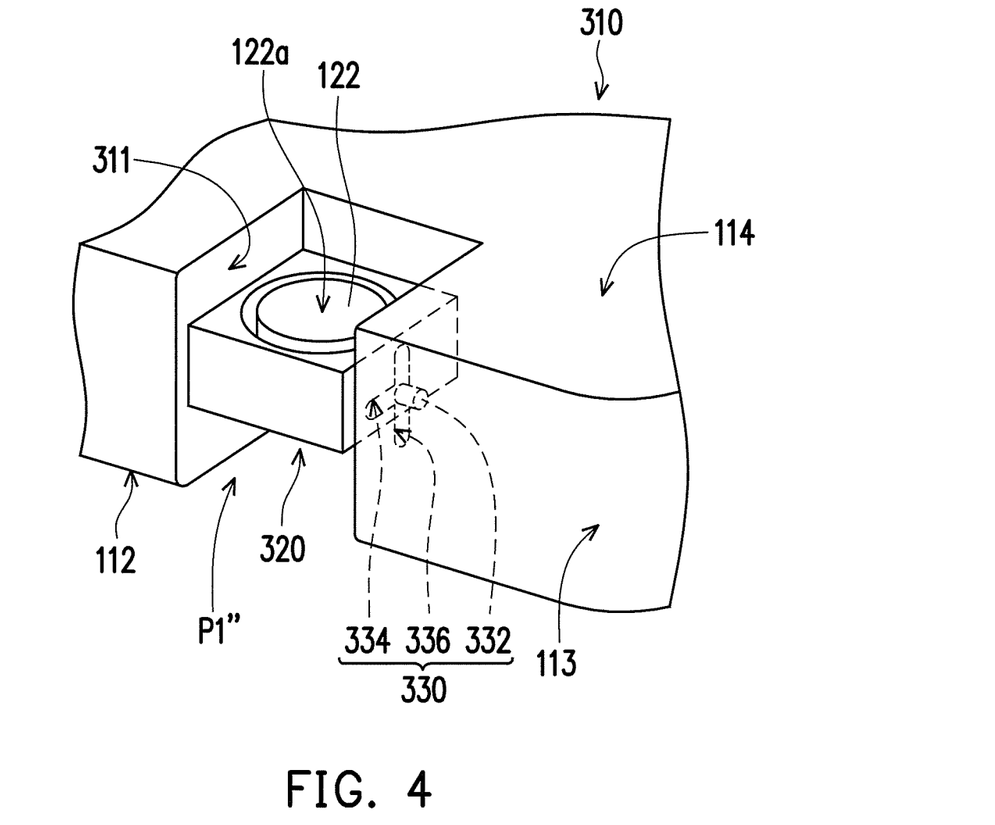
FIG. 4 is a three-dimensional view of a portable electronic device according to another embodiment of the invention.

FIG. 4 is a three-dimensional view of a portable electronic device according to another embodiment of the invention. The present embodiment is similar to the embodiment of FIG. 3A to FIG. 3E, and a difference there between is that in the present embodiment, the movement mechanism 330 of the portable electronic device 300 may further include a second slide chute 336. The second slide chute 336 is disposed in extension along a direction parallel to the thickness direction of the main body 110 and is perpendicular to the first slide chute 334. Moreover, the first slide chute 334 and the second slide chute 336 are intersected at a center of the second slide chute 336. Therefore, the camera module 320 can be slid towards the back surface 114 of the main body 310 along the second slide chute 336, such that the wide angle lens 122 of the camera module 320 is protruded out of the back surface 114 of the main body 310 to facilitate the user photographing images in the front. Moreover, the camera module 320 can also be pivotally rotated relative to the main body 310 by 180 degrees along the pivot 332 such that the wide angle lens 122 of the camera module 320 is rotated from a direction facing the back surface 114 of the main body 310 shown in to a direction facing the front surface 112 of the main body 310. Meanwhile, the camera module 320 can be further slid towards the front surface 112 of the main body 310 through the second slide chute 336, such that the wide angle lens 122 of the camera module 320 is protruded out of the front surface 112 of the main body 310 to facilitate the user taking pictures of himself or taking pictures behind the back of the user by using the wide angle lens 122.

In the present embodiment, the user of the portable electronic device 300 may make the camera module 320 to rotate relative to the main body 310 in a manual manner. Moreover, the pivot 332 of the present embodiment can be further electrically coupled to various driving units such as a micro motor, and the micro motor may drive the pivot 332 to pivotally rotate and accordingly drive the camera module 320 to rotate. Moreover, the first slide chute 334 and the second slide chute 336 of the present embodiment can be additionally configured with a positioning mechanism or a positioning slot to temporarily fix the camera module 320 to different photographing positions or angles relative to the main body 310 according to an actual photographing requirement of the user.

In the present embodiment, the wide angle lens 122 of the camera module 320 can be retracted in the accommodating groove 311 to implement the normal mode photographing. Alternatively, the user may also move the camera module 320 through the movement mechanism 330 to make the wide angle lens 122 of the camera module 320 to be protruded out of the front surface 122, the back surface 114 or the side surface 113 of the main body 310, such that the user may implement wide angle or fish-eye mode photographing in different angles, directions and positions relative to the main body 310 of the portable electronic device 300.

In summary, the camera module of the portable electronic device of a plurality of embodiments of the invention has the wide angle lens, and the camera module can be slid or rotated between the first position and the second position in the portable electronic device through the movement mechanism. Therefore, the wide angle lens of the camera module can be embedded in the accommodating groove of the main body to provide proper shield and protection to the wide angle lens, so as to avoid collision or friction of the wide angle lens to cause damage. Moreover, the wide angle lens of the camera module can be protruded out of the surface of the main body and the accommodating groove through convey of the movement mechanism, so as to implement wide angle, ultra-wide angle or fish-eye mode photographing in different directions of the portable electronic device. Moreover, in the invention, the user is unnecessary to additionally install other auxiliary lens on the portable electronic device in order to achieve the wide angle photographing effect, such that usage convenience of the user is improved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A portable electronic device, comprising:
    a main body, having an accommodating groove located in the main body and exposed at a surface thereof;
    a camera module, disposed in the accommodating groove, and having a wide angle lens; and
    a movement mechanism, located between the camera module and the accommodating groove, and the camera module being configured to move between a first position and a second position in the accommodating groove through the movement mechanism, wherein when the camera module is located at the first position, an upper surface of the wide angle lens is lower than or equal to the surface of the main body, and when the camera module is located at the second position, the wide angle lens is protruded out of the surface of the main body,
    wherein the movement mechanism comprises a slide rail disposed on a wall of the accommodating groove in extension along a thickness direction of the main body, and the camera module has at least a protrusion portion disposed on a side surface of the camera module and corresponding to the slide rail, and the protrusion portion is slidingly disposed in the slide rail, such that the camera module is configured to slide between the first position and the second position along the slide rail.

2. The portable electronic device as claimed in claim 1, wherein the wide angle lens is an ultra-wide angle lens or a fish-eye lens.

3. The portable electronic device as claimed in claim 1, wherein the main body has a front surface and a back surface opposite to each other, and the portable electronic device has a display screen disposed on the front surface.

4. The portable electronic device as claimed in claim 3, wherein when the camera module is moved to the second position, the wide angle lens is protruded out of a side surface connecting the front surface and the back surface.

5. A portable electronic device, comprising:
    a main body, having an accommodating groove located in the main body and exposed at a surface thereof;
    a camera module, disposed in the accommodating groove, and having a wide angle lens; and
    a movement mechanism, located between the camera module and the accommodating groove, and the camera module being configured to move between a first position and a second position in the accommodating groove through the movement mechanism, wherein when the camera module is located at the first position, an upper surface of the wide angle lens is lower than or equal to the surface of the main body, and when the camera module is located at the second position, the wide angle lens is protruded out of the surface of the main body,
    wherein the movement mechanism comprises a pivot, a first slide chute and a second slide chute, the first slide chute is disposed on a wall of the accommodating groove in extension along a direction perpendicular to a thickness direction of the main body, the pivot is pivotally connected to the camera module and the first slide chute, such that the camera module is configured to pivotally rotate along the pivot and slide along the first slide chute to move from the first position to the second position, the second slide chute is disposed on the wall of the accommodating groove in extension along the thickness direction of the main body, and the first slide chute and the second slide chute are perpendicularly intersected with each other.

6. The portable electronic device as claimed in claim 5, wherein when the camera module is slid to the second position along the second slide chute, the wide angle lens is protruded out of the back surface.

7. The portable electronic device as claimed in claim 5, wherein when the camera module is slid to the second position along the second slide chute, the wide angle lens is protruded out of the front surface.

8. The portable electronic device as claimed in claim 1, wherein a thickness of the camera module is smaller than or equal to a thickness of the main body.

9. The portable electronic device as claimed in claim 1, wherein the portable electronic device is a smart phone or a tablet personal computer.

10. The portable electronic device as claimed in claim 1, wherein when the camera module is moved to the second position, the camera module is configured to photograph a wide angle image through the wide angle lens.

* * * * *